US006726120B2

(12) United States Patent
Schaffter et al.

(10) Patent No.: US 6,726,120 B2
(45) Date of Patent: Apr. 27, 2004

(54) AUTOMATIC WIND-DRIFT COMPENSATION SYSTEM FOR AGRICULTURAL SPRAYERS

(75) Inventors: Barry W. Schaffter, Clive, IA (US); Terence D. Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 141 days.

(21) Appl. No.: 10/024,909

(22) Filed: Dec. 19, 2001

(65) Prior Publication Data

US 2003/0111546 A1 Jun. 19, 2003

(51) Int. Cl.[7] ............................ A01G 27/00; B05B 1/20

(52) U.S. Cl. ........................... 239/69; 239/67; 239/159; 239/162; 239/163; 239/166

(58) Field of Search ................................ 239/170, 159, 239/161, 160, 162, 163, 172, 726, 67, 69–71, 171, 164, 176, 166

(56) References Cited

U.S. PATENT DOCUMENTS 4,927,080 A 5/1990 Alsing
5,334,987 A * 8/1994 Teach ......................... 701/214
5,348,226 A * 9/1994 Heiniger et al. ............... 239/1
5,653,389 A * 8/1997 Henderson et al. ........... 239/69
5,704,546 A * 1/1998 Henderson et al. ............ 239/1
5,751,576 A 5/1998 Monson
5,964,410 A * 10/1999 Brown et al. ............... 239/159

FOREIGN PATENT DOCUMENTS

DE 198 21 277 A 1 11/1999

* cited by examiner

*Primary Examiner*—Davis Hwu

(57) ABSTRACT

An automatic wind-drift compensation system is provided for an agricultural sprayer. The system includes a control unit adapted to receive input data including wind speed and direction, vehicle speed and direction, and desired spray overlap. The control unit is programmed with a set of instructions for processing the data and generating output data. The output data facilitates steering of the sprayer through the field to achieve the desired spray overlap.

17 Claims, 5 Drawing Sheets

AUTOMATIC WIND-DRIFT COMPENSATION SYSTEM FOR AGRICULTURAL SPRAYERS

BACKGROUND OF THE INVENTION

Agricultural spraying of soil nutrients, insecticides and pesticides is common, and typically involves the use of a boom-type sprayer pulled behind a tractor. Recently, various navigation aid systems have been developed with increased accuracy for steering the tractor through the field on a desired path. Examples of such steering systems include the John Deere Parallel Tracking and AutoTrak system, IntigriNautics AutoSteer products, and systems by Trimble, and Beeline.

However, none of these navigation aid systems which are currently available have the means or algorithmic concept to account for the wind-drift of the spray from the spray nozzles. Such wind-drift leads to an incorrect overlap of the sprayed solution from one pass to the next. The cross-path wind-drift can be significant and result in overapplication or underapplication of the spray solution. The wind-drift can also present environmental issues, for example, with excessive spray overlap or when the spray drifts to undesired areas.

Accordingly, a primary objective of the present invention is the provision of a system which automatically compensates for wind-drift for agricultural sprayers.

Another objective of the present invention is a system to facilitate the steering of an agricultural sprayer through a field to achieve a desired spray overlap.

Another objective of the present invention is the provision of a method of automatically compensating for wind-drift during spraying by an agricultural sprayer.

Still another objective of the present invention is the provision of an agricultural sprayer having a weather station thereon for sensing wind speed and direction, and a control unit adapted to receive input data regarding wind speed and direction, vehicle speed and direction, and the desired spray overlap, and then generate output data to facilitate steering of the sprayer through the field to achieve the desired spray overlap.

Another objective of the present invention is the provision of an agricultural sprayer with a control unit programmed with a set of instructions for processing input data and generating output data to accommodate wind-drift.

Yet another objective of the present invention is the provision of an agricultural sprayer having a navigation aid system with a control unit operatively connected thereto to facilitate steering of the agricultural sprayer in consideration of wind-drift.

These and other objectives will become apparent from the following description of the invention.

BRIEF SUMMARY OF THE INVENTION

The Automatic Wind-Drift Compensation System of the present invention is intended for use on an agricultural sprayer having a navigation aid system installed thereon. The system includes a control unit adapted to receive input data, including wind speed, wind direction, vehicle speed, vehicle direction, and desired spray overlap. A set of instructions is programmed into the control unit for processing the input data and for generating output data in response to the input data. The output data is used to direct the sprayer, or facilitate steering of the sprayer, through the field so as to achieve the desired spray overlap. The system may also include a weather station on the sprayer for sensing the wind speed and wind direction. The sprayer height may also be one of the input data processed by the control unit.

DETAILED DESCRIPTION OF THE INVENTION

Figure 1:
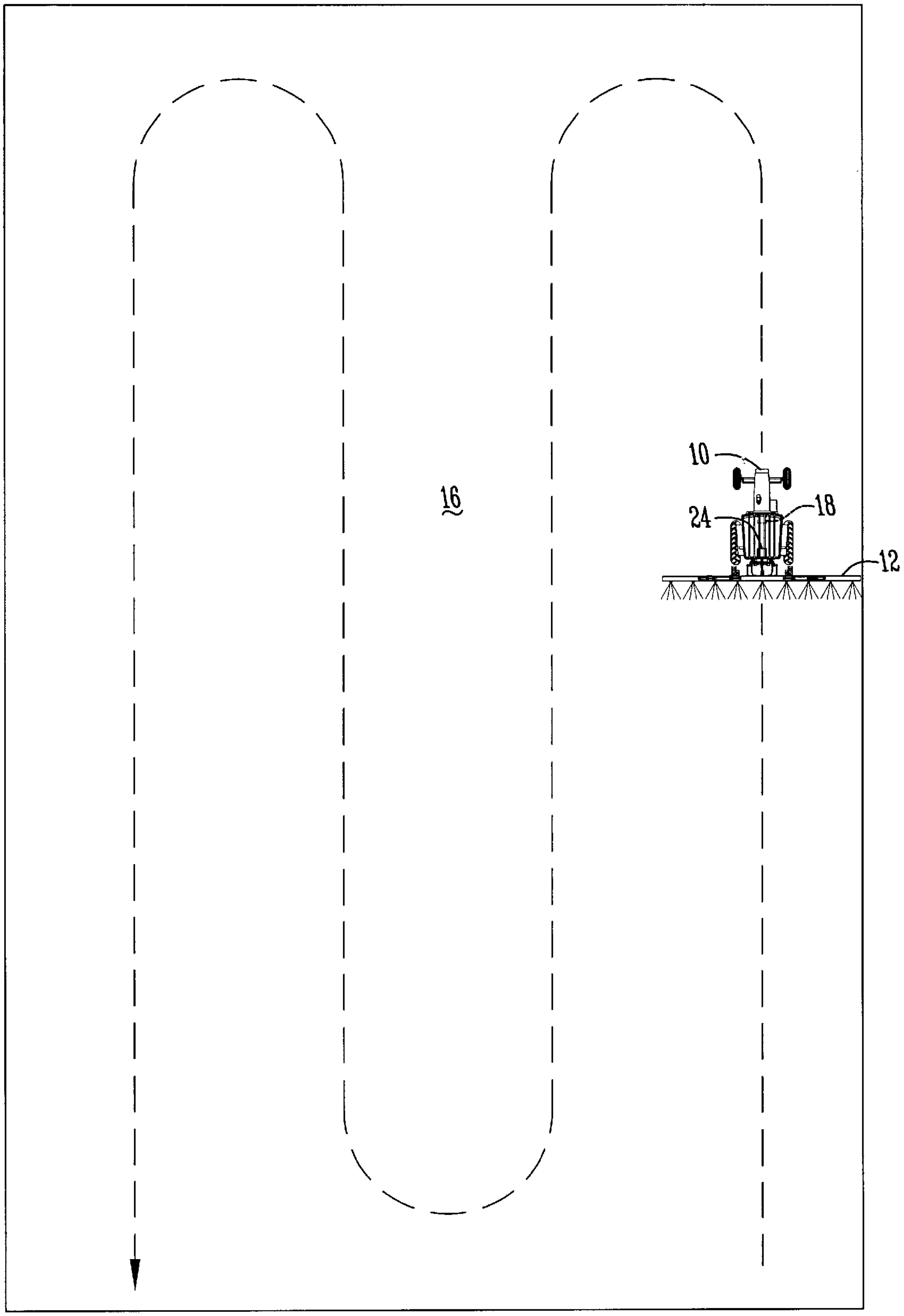
FIG. 1 is a top plan view of a tractor with an agricultural sprayer positioned in a field being sprayed with a solution from the sprayer.
Figure 2A:
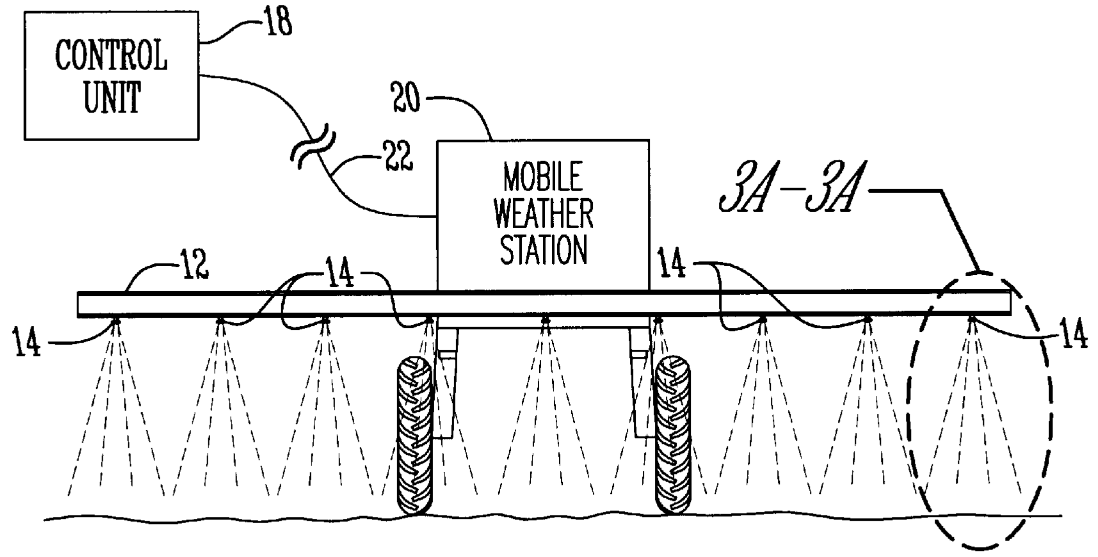
FIG. 2A is a simplified rear elevation view of the sprayer with the mobile weather station according to the present invention and with no wind.
Figure 2B:
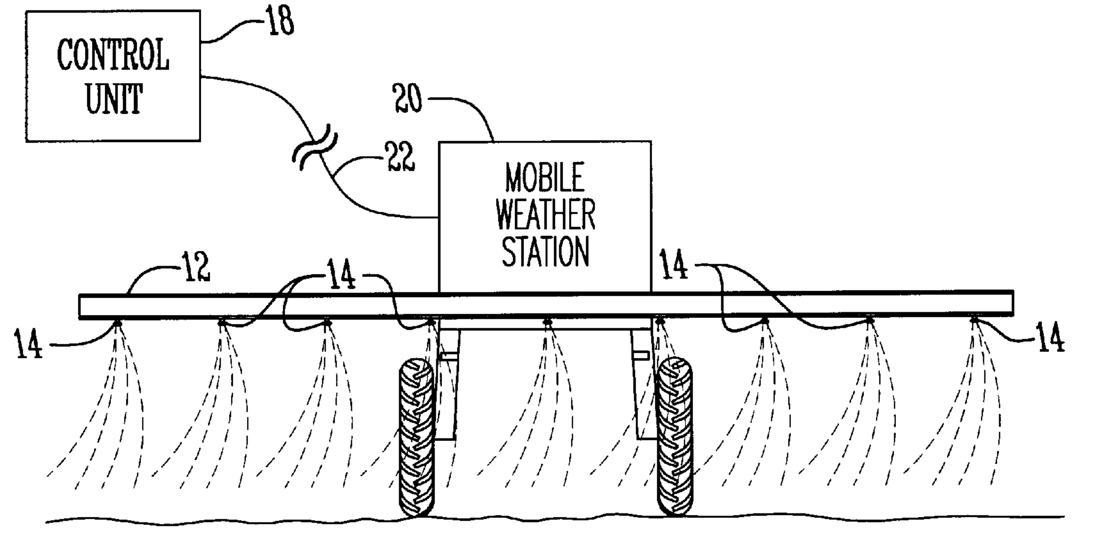
FIG. 2B is a view similar to FIG. 2A showing the spray in a windy condition.
Figure 3A:
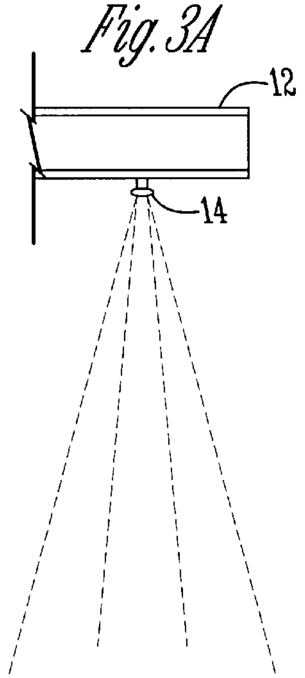
FIG. 3A is an enlarged view taken along lines 3A—3A of FIG. 2.
Figure 3B:
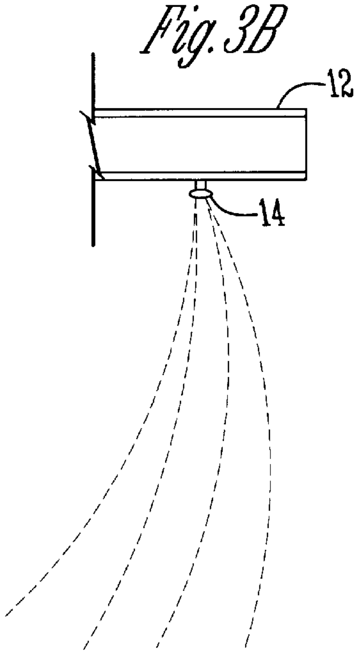
FIG. 3B is a view similar to FIG. 3A showing a spray pattern in moderate wind.
Figure 3C:
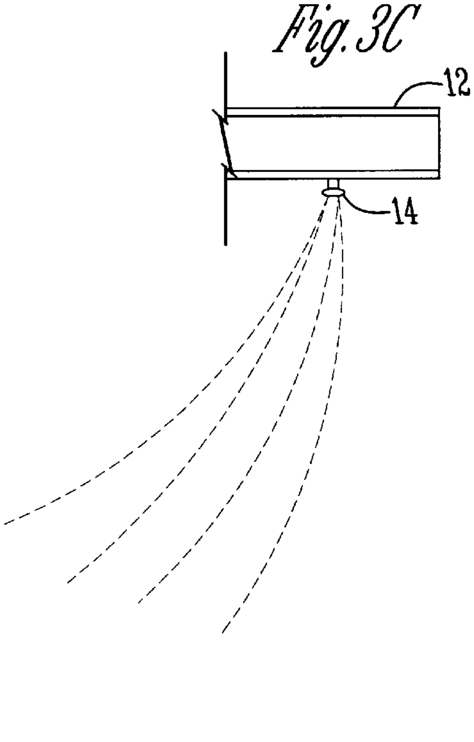
FIG. 3C is a view similar to FIG. 3A showing a spray pattern in a strong wind.

A conventional tractor 10 is shown in FIG. 2 pulling an agricultural sprayer 12 having a plurality of spray nozzles 14. The sprayer 12 is adapted to spray solution, such as soil nutrients, insecticides or pesticides from a reservoir (not shown) through the nozzles 14 onto the field 16. Depending upon the nozzle 14, the spray pattern may be conical or elliptical. Ideally, the spray pattern of adjacent nozzles 14 overlap one another, if at all, to an extent necessary to achieve a uniform application of the solution to the field 16. The sprayer 12 is also conventional and does not constitute a part of the present invention.

The present invention is directed towards a system which automatically compensates for wind-drift of the sprayed solution as the tractor 10 and sprayer 12 move through the field 16. More particularly, the system includes a control unit 18 which is preferably mounted in the cab of the tractor 10 for easy access by the operator of the tractor. A mobile weather station 20 is provided on the sprayer 12, preferably at a height above the cab of the tractor 10, so as to avoid or minimize ground turbulence, which can cause inaccurate readings. The weather station 20 senses the wind speed and direction and generates corresponding signals to the control unit 18. The control unit 18 may be hard wired to the weather station 20 via electrical wires 22. Alternatively, the operative connection between the control unit 18 and the weather station 20 may be wireless, in accordance with known technology.

Figure 4:
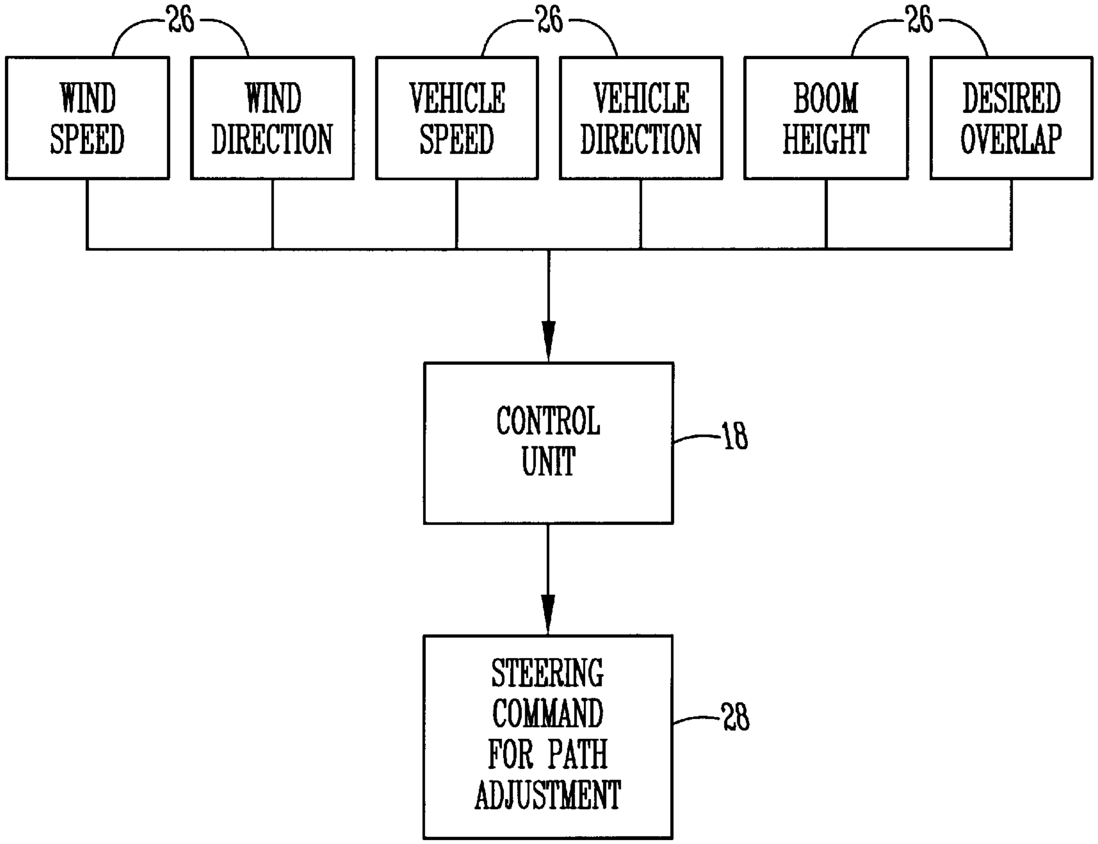
FIG. 4 is a schematic block diagram showing the input data and output data for the control unit of the system of the present invention.

The operator also inputs data into the control unit 18 such as the tractor speed, the tractor direction, the desired spray overlap, path plan, the wind speed and direction, and the sprayer height. The control unit 18 is programmed with a set of instructions, or an algorithm, for processing the input data 26 and generating output data 28, as represented in FIG. 4. The output data 28 allows the tractor 10, which is equipped with a standard navigation aid system 24, to be steered through the field 16 so as to achieve the desired spray overlap, while accommodating for wind-drift.

The method of the present invention allows for automatic compensation for wind-drift during the spraying operation by the sprayer 12. According to the method, the input data 26 is generated regarding wind speed, wind direction, sprayer speed, sprayer direction, sprayer height, and desired spray overlap. This input data is sent to the control unit 18, which then generates the output data 28 used for steering or directing the tractor 10 and the attached sprayer 12 through the field to achieve the desired spray overlap.

Figure 5:
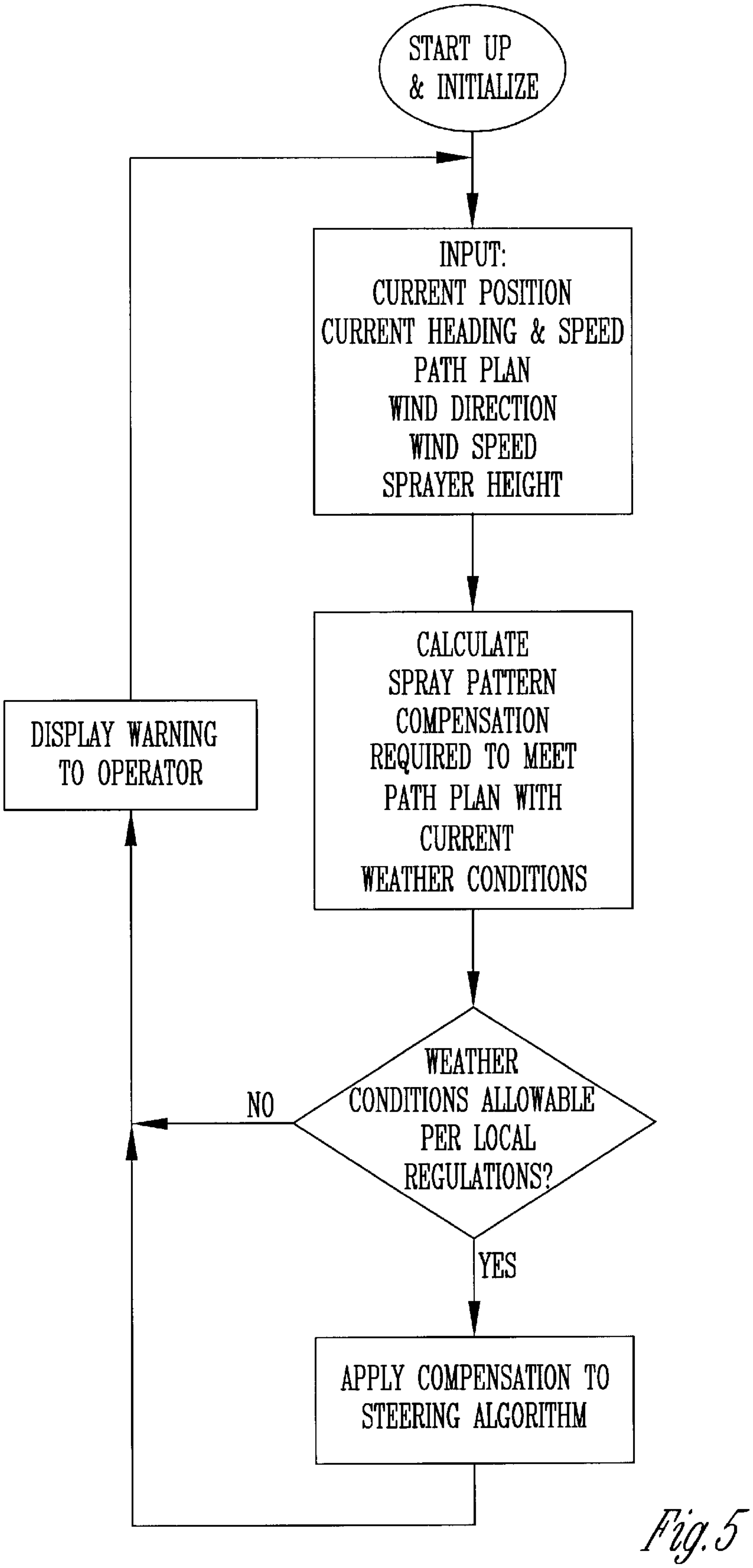
FIG. 5 is a flowchart for the process of the present invention.

The process of the present invention is schematically shown in the flowchart of FIG. 5. Following the start up and initialization step, the various data regarding position, heading and speed, path plan, wind direction, wind speed, and sprayer height are input. Next, the compensation for the spray pattern is calculated so as to meet the path plan under the current weather conditions. Then, a check is made to assure that spraying under the current weather conditions is permissible in light of local regulations. If not, a warning is displayed to the operator. If local regulations do not preclude spraying, then the spray pattern composition is applied to the steering algorithm of the control unit 18. The spray operation then begins, and continues with repeated or continuous re-evaluation of each of the above steps, other than start up and initialization.

Whereas the invention has been shown and described in connection with the preferred embodiment thereof, it will be understood that any modifications, substitutions, and additions may be made which are within the intended broad scope of the following claims. From the foregoing, it can be seen that the present invention accomplishes at least all of the stated objectives.

What is claimed is:

1. An automatic wind-drift compensation system for an agricultural sprayer, comprising:

a control unit adapted to receive input data including wind speed, wind direction, vehicle speed, vehicle direction and desired spray overlap; and the control unit adapted to generate output data based on the input data to facilitate steering of the sprayer through the field and to achieve the desired spray overlap.

2. The system of claim 1 further comprising a mobile weather station on the sprayer for sensing the wind speed and wind direction.

3. The system of claim 2 wherein the weather station is spaced above the ground to minimize ground turbulence.

4. The system of claim 1 further comprising a set of instructions programmed into the control unit for processing the input data and generating the output data.

5. The system of claim 1 wherein the input data further includes height of the sprayer.

6. The system of claim 1 further comprising a navigation aid system operatively connected to the control unit.

7. A method of automatically compensating for wind-drift during spraying by an agricultural sprayer, comprising:

generating input data regarding wind speed, wind direction, sprayer speed, sprayer directions, and desired spray overlap;

sending the input data to a control unit;

generating output data from the control unit based on the input data; and steering the sprayer through the field in response to the output data to achieve the desired spray overlap.

8. The method of claim 7 wherein the wind speed and wind direction input data is generated by a mobile weather station on the sprayer.

9. The method of claim 7 further comprising programming the control unit with a set of instructions for processing the input data and for generating the output data.

10. The method of claim 7 further comprising generating input data regarding sprayer height and sending the sprayer height data to the control unit for processing.

11. The method of claim 7 further comprising operatively connecting the control unit to a navigation aid system for steering the sprayer.

12. A system to facilitate steering of an agricultural sprayer through a field to achieve a desired overlap of spray, comprising:

input data including wind speed and direction, and sprayer speed and direction;

a processor for processing the input data and generating output data; and the output data being used to direct the sprayer for desired spray overlap.

13. The system of claim 12 wherein the system includes a weather station on the sprayer to sense wind speed and direction.

14. The system of claim 13 wherein the weather station generates the wind speed and direction input data.

15. The system of claim 12 further comprising a set of instructions programmed into the control unit for generating the output data based on the input data.

16. The system of claim 12 wherein the input data further includes sprayer height.

17. The system of claim 12 further comprising a navigation system operatively connected to the control unit.

* * * * *